(12) United States Patent
Yin

(10) Patent No.: US 11,386,353 B2
(45) Date of Patent: Jul. 12, 2022

(54) METHOD AND APPARATUS FOR TRAINING CLASSIFICATION MODEL, AND METHOD AND APPARATUS FOR CLASSIFYING DATA

(71) Applicant: Tencent Technology (Shenzhen) Company Limited, Shenzhen (CN)

(72) Inventor: Hongjun Yin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 317 days.

(21) Appl. No.: 16/286,894

(22) Filed: Feb. 27, 2019

(65) Prior Publication Data

US 2019/0197429 A1 Jun. 27, 2019

Related U.S. Application Data

(63) Continuation of application No. PCT/CN2017/107626, filed on Oct. 25, 2017.

(30) Foreign Application Priority Data

Dec. 12, 2016 (CN) .......................... 201611139498.5

(51) Int. Cl.
   *G06N 20/00* (2019.01)

(52) U.S. Cl.
   CPC ..................... *G06N 20/00* (2019.01)

(58) Field of Classification Search
   CPC ........... G06N 20/00; G06N 3/08; G06N 3/084
   See application file for complete search history.

(56) References Cited

U.S. PATENT DOCUMENTS

| 9,552,549 | B1 * | 1/2017 | Gong ................... G06N 3/0454 |
| 9,564,123 | B1 * | 2/2017 | Mont-Reynaud ....... G10L 15/02 |

(Continued)

FOREIGN PATENT DOCUMENTS

| CN | 104102705 A | 10/2014 |
| CN | 104850531 A | 8/2015 |
| CN | 105787046 A | 7/2016 |

OTHER PUBLICATIONS

Li, "A gentle introduction to gradient boosting", Apr. 2016, Northeastern University: http://www.ccs.neu.edu/home/vip/teach/MLcourse/4_boosting/slides/gradient_boosting.pdf, 2016, pp. 1-80 (Year: 2016).*

(Continued)

*Primary Examiner* — Ann J Lo
*Assistant Examiner* — Leonard A Sieger
(74) *Attorney, Agent, or Firm* — Crowell & Moring LLP

(57) ABSTRACT

This application discloses a method and an apparatus for training a classification model. The method includes obtaining a training sample, the training sample including a training parameter and a true classification corresponding to the training parameter and preforming classification training on an initial classification model by using the training parameter, to obtain a predicted classification. The method also includes determining a residual between the true classification and the predicted classification according to a gradient loss function of the initial classification model, the gradient loss function comprising a distance factor representing a distance between a first category and a second category, the first category being a category to which the predicted classification belongs, and the second category being a category to which the true classification belongs. The method further includes modifying the initial classification model according to the residual to obtain a final classification model.

20 Claims, 6 Drawing Sheets

(56) References Cited

U.S. PATENT DOCUMENTS

| | | | |
|---|---|---|---|
| 2005/0100209 A1 | 5/2005 | Lewis et al. | |
| 2008/0101705 A1* | 5/2008 | Mohamed | G06K 9/6272 |
| | | | 382/224 |
| 2010/0250523 A1* | 9/2010 | Jin | G06F 16/951 |
| | | | 707/723 |
| 2015/0006259 A1* | 1/2015 | Yoo | G16H 40/20 |
| | | | 705/7.39 |
| 2015/0006422 A1* | 1/2015 | Carter | G06Q 10/1053 |
| | | | 705/321 |
| 2015/0302755 A1* | 10/2015 | Breck | G09B 5/12 |
| | | | 434/362 |

OTHER PUBLICATIONS

Friedman, "Greedy function approximation: a gradient boosting machine", 2001, Annals of statistics, 2001, pp. 1189-1232 (Year: 2001).*

McDermott et al., "Prototype-based MCE/GPD training for word spotting and connected word recognition", 1993, 1993 IEEE International Conference on Acoustics, Speech, and Signal Processing, vol. 2, pp. 291-294 (Year: 1993).*

Baccianella et al., "Evaluation Measures for Ordinal Regression", 2009, Ninth International Conference on Intelligent Systems Design and Applications, vol. 9 (2009), pp. 283-287 (Year: 2009).*

Kim et al., "Ordinal Classification of Imbalanced Data with Application in Emergency and Disaster Information Services", Sep.-Oct. 2016, IEEE Intelligent Systems, vol. 31 No. 5, pp. 50-56 (Year: 2016).*

Liu et al., "Ordinal Regression Analysis: Using Generalized Ordinal Logistic Regression Models to Estimate Educational Data", 2012, Journal of Modern Applied Statistical Methods, vol. 11 iss. 1, 242-254 (Year: 2012).*

Chu et al., "Support Vector Ordinal Regression", 2007, Neural Computation, vol. 19 issue 3, pp. 792-815 (Year: 2007).*

Waegeman et al., "An ensemble of weighted support vector machines for ordinal regression", 2009, International Journal of Computer Systems Science and Engineering, v 3.1 (2009), pp. 47-51. (Year: 2009).*

Chinese Office Action with concise English explanation regarding 201611139498.5 dated Mar. 8, 2021, 5 pages.

International Search Report received for PCT Application No. PCT/CN2017/107626 dated Dec. 27, 2017 (with brief English translation), 4 pages.

* cited by examiner

METHOD AND APPARATUS FOR TRAINING CLASSIFICATION MODEL, AND METHOD AND APPARATUS FOR CLASSIFYING DATA

RELATED APPLICATION

This application claims priority to PCT Patent Application No. PCT/CN2017/107626, filed on Oct. 25, 2017, which claims priority to Chinese Patent Application No. 201611139498.5, filed with the Chinese Patent Office on Dec. 12, 2016, both of are incorporated by reference in their entireties.

FIELD OF THE TECHNOLOGY

This application relates to the field of data processing technologies, and specifically, to a method and an apparatus for training a classification model, and a method and an apparatus for classifying data.

BACKGROUND OF THE DISCLOSURE

An eXtreme Gradient Boosting (Xgboost) model is a classification integrated learning model implemented according to a gradient boosting decision tree (GBDT) principle and based on C++, and a feature of the model is implementing classification of high accuracy and a fast operation speed by using multithreading of a central processing unit (CPU).

When classification is performed by using Xgboost, a problem of a classification error occurs. For example, an elementary school student is classified as a junior school student or a doctoral student. This belongs to the classification error, that is, a problem of an inaccuracy classification exists. In addition, in a model training stage, punishment of costs is given to a case of the classification error, thereby gradually improving accuracy of a model classification. However, punishment of same costs is currently given to all cases of classification errors. This is not beneficial to quickly improving classification accuracy of the model.

SUMMARY

To resolve a problem in the existing technology that classification model training is inaccurate and a training speed is low, embodiments of this application provide a method for training a classification model, a distance factor representing a distance between a category to which a true classification belongs and a category to which a predicted classification belongs is introduced in a gradient loss function of an initial classification model so that residuals of different values are generated for different classification errors, thereby quickly improving classification accuracy of a classification model. The embodiments of this application further provide a corresponding method for classifying data to improve accuracy of data classification. The embodiments of this application further provide corresponding apparatuses.

The present disclosure describes a method for training a classification model, the method includes obtaining, by a device comprising a memory storing instructions and a processor in communication with the memory, a training sample, the training sample comprising a training parameter and a true classification corresponding to the training parameter. The method includes performing, by the device, classification training on an initial classification model by using the training parameter, to obtain a predicted classification. The method also includes determining, by the device, a residual between the true classification and the predicted classification according to a gradient loss function of the initial classification model, the gradient loss function comprising a distance factor representing a distance between a first category and a second category, the first category being a category to which the predicted classification belongs, and the second category being a category to which the true classification belongs. The method further includes modifying, by the device, the initial classification model according to the residual to obtain a final classification model.

The present disclosure describes an apparatus for training a classification model. The apparatus includes a memory storing instructions and a processor in communication with the memory. When the processor executes the instructions, the processor is configured to cause the apparatus to obtain a training sample and the training sample includes a training parameter and a true classification corresponding to the training parameter. When the processor executes the instructions, the processor is configured to cause the apparatus to perform classification training on an initial classification model by using the training parameter obtained by using the sample obtaining unit, to obtain a predicted classification. When the processor executes the instructions, the processor is also configured to cause the apparatus to determine, according to a gradient loss function of the initial classification model, a residual between the true classification and the predicted classification trained by the model training unit, the gradient loss function comprising a distance factor representing a distance between a first category and a second category, the first category being a category to which the predicted classification belongs, and the second category being a category to which the true classification belongs. When the processor executes the instructions, the processor is further configured to cause the apparatus to modify, according to the residual, the initial classification model to obtain a final classification model.

The present disclosure describes a non-transitory computer readable storage medium storing instructions. The instructions, when executed by a processor, cause the processor to obtain a training sample, the training sample comprising a training parameter and a true classification corresponding to the training parameter. The instructions, when executed by a processor, cause the processor to perform classification training on an initial classification model by using the training parameter obtained by using the sample obtaining unit, to obtain a predicted classification. The instructions, when executed by a processor, cause the processor to determine, according to a gradient loss function of the initial classification model, a residual between the true classification and the predicted classification trained by the model training unit, the gradient loss function comprising a distance factor representing a distance between a first category and a second category, the first category being a category to which the predicted classification belongs, and the second category being a category to which the true classification belongs. The instructions, when executed by a processor, cause the processor to modify, according to the residual, the initial classification model to obtain a final classification model.

An embodiment of this application provides a method for training a classification model, including:

obtaining a training sample, the training sample including a training parameter and a true classification corresponding to the training parameter;

performing classification training on an initial classification model by using the training parameter, to obtain a predicted classification;

determining a residual between the true classification and the predicted classification according to a gradient loss function included in the initial classification model, the gradient loss function including a distance factor representing a distance between a first category and a second category, the first category being a category to which the predicted classification belongs, and the second category being a category to which the true classification belongs; and modifying the initial classification model according to the residual to obtain a final classification model.

In a possible implementation, the performing classification training on an initial classification model by using the training parameter, to obtain a predicted classification includes:

performing iterative calculation on the initial classification model by using the training parameter, to obtain a predicted classification generated by a classification model used in each iteration;

correspondingly, the determining a residual between the true classification and the predicted classification according to a gradient loss function included in the initial classification model includes:

determining, according to the gradient loss function included in the initial classification model, a residual between the true classification and the predicted classification generated in each iteration; and correspondingly, modifying the initial classification model according to the residual to obtain a final classification model includes:

modifying, according to a residual determined in the $M^{th}$ iteration, a classification model used in the $M^{th}$ iteration to obtain a classification model used in the $(M+1)^{th}$ iteration, and obtaining the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In a possible implementation, the determining, according to the gradient loss function included in the initial classification model, a residual between the true classification and the predicted classification generated in each iteration includes:

determining, according to the training parameter, the true classification, and the distance factor representing the difference between the category to which the true classification belongs and a category to which a predicted classification in each iteration belongs, a residual between the true classification and the predicted classification in each iteration.

In a possible implementation, the determining, according to the training parameter, the true classification, and the distance factor representing the difference between the category to which the true classification belongs and a category to which a predicted classification in each iteration belongs, a residual between the true classification and the predicted classification in each iteration includes:

determining a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) / \sum_{l=1}^{K} \exp(F'_l(x_i)),$$

$$F'_k(x_i) = D_{yk} * F_k(x_i),$$

where $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, where K is a quantity of classes of the true classification.

In this implementation, a distance factor representing a distance between a category to which a true classification belongs and a category to which a predicted classification belongs is introduced in a gradient loss function of an initial classification model. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model.

An embodiment of this application provides a method for classifying data including:

receiving to-be-classified data;

classifying the to-be-classified data by using a target classification model, to obtain a classification result, the target classification model being a final classification model obtained by using the method according to any one of possible implementations of the foregoing method for training a classification model; and outputting the classification result.

When the final classification model obtained by using the method according to any one of the possible implementations of the foregoing method for training a classification model is used to classify data, because classification accuracy of the final classification model is relatively high, accuracy of data classification is improved.

An embodiment of this application provides an apparatus for training a classification model, including:

a sample obtaining unit, configured to obtain a training sample, the training sample including a training parameter and a true classification corresponding to the training parameter;

a model training unit, configured to perform classification training on an initial classification model by using the training parameter obtained by using the sample obtaining unit, to obtain a predicted classification;

a residual determining unit, configured to determine, according to a gradient loss function included in the initial classification model, a residual between the true classification and the predicted classification trained by the model training unit, the gradient loss function including a distance factor representing a distance between a first category and a second category, the first category being a category to which the predicted classification belongs, and the second category being a category to which the true classification belongs; and a model modification unit, configured to modify, according to the residual determined by the residual determining unit, the initial classification model to obtain a final classification model.

In a possible implementation, the model training unit is configured to perform iterative calculation on the initial classification model by using the training parameter, to obtain a predicted classification generated by a classification model used in each iteration;

the residual determining unit is configured to determine, according to the gradient loss function included in the initial classification model, a residual between the true classification and the predicted classification generated in each iteration; and the model modification module is configured to modify, according to a residual determined in the $M^{th}$ iteration, a classification model used in the $M^{th}$ iteration to obtain a classification model used in the $(M+1)^{th}$ iteration, and obtain the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In a possible implementation, the residual determining unit is configured to determine, according to the training parameter, the true classification, and the distance factor representing the difference between the category to which the true classification belongs and a category to which a predicted classification in each iteration belongs, a residual between the true classification and the predicted classification in each iteration.

In a possible implementation, the residual determining unit is configured to determine a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) \Big/ \sum_{l=1}^{K} \exp(F'_l(x_i)), \text{ and}$$

$$F'_k(x_i) = D_{yk} * F_k(x_i),$$

where $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, where K is a quantity of classes of the true classification.

For beneficial effects of a possible implementation of each part in the apparatus for training a classification model provided in this embodiment of this application, refer to beneficial effects of a method corresponding to the possible implementation of each part in the foregoing method for training a classification model.

An embodiment of this application provides an apparatus for classifying data including:

a data receiving unit, configured to receive to-be-classified data;

a data classification unit, configured to classify the to-be-classified data by using a target classification model, to obtain a classification result, the target classification model being a final classification model obtained by using the apparatus for training a classification model according to any one of possible implementations of the foregoing apparatus for training a classification model; and a data output unit, configured to output the classification result obtained by the data classification unit by means of classification.

For beneficial effects of a possible implementation of each part in the apparatus for classifying data provided in this embodiment of this application, refer to beneficial effects of a method corresponding to the possible implementation of each part in the foregoing method for classifying data.

An embodiment of this application provides a device for training a classification model, including:

a processor and a memory, the memory being configured to store program code and transmit the program code to the processor; and the processor being configured to perform, according to an instruction in the program code, the method for training a classification model according to any one of the possible implementations of the forgoing method for training a classification model.

An embodiment of this application provides a device for classifying data including:

a processor and a memory, the memory being configured to store program code and transmit the program code to the processor; and the processor being configured to perform, according to an instruction in the program code, the foregoing method for classifying data.

For beneficial effects of a possible implementation of each part in the device for classifying data provided in this embodiment of this application, refer to beneficial effects of a method corresponding to the possible implementation of each part in the foregoing method for classifying data.

An embodiment of this application provides a storage medium, configured to store program code, the program code being used for performing the method for training a classification model according to any one of the possible implementations of the forgoing method for training a classification model.

For beneficial effects of a possible implementation of each part in the storage medium provided in this embodiment of this application, refer to beneficial effects of a method corresponding to the possible implementation of each part in the foregoing method for training a classification model.

An embodiment of this application provides a storage medium, configured to store program code, the program code being used for performing the foregoing method for classifying data.

For beneficial effects of a possible implementation of each part in the storage medium provided in this embodiment of this application, refer to beneficial effects of a method corresponding to the possible implementation of each part in the foregoing method for classifying data.

An embodiment of this application provides a computer program product including an instruction, enabling, when running on a computer, the computer to perform the method for training a classification model according to any one of the possible implementations of the foregoing method for training a classification model.

For beneficial effects of a possible implementation of each part in the computer program product including an instruction provided in this embodiment of this application, refer to beneficial effects of a method corresponding to the possible implementation of each part in the foregoing method for training a classification model.

An embodiment of this application provides a computer program product including an instruction, enabling, when running on a computer, the computer to perform the foregoing method for classifying data.

For beneficial effects of a possible implementation of each part in the computer program product including an instruction provided in this embodiment of this application, refer to beneficial effects of a method corresponding to the possible implementation of each part in the foregoing method for classifying data.

An embodiment of this application provides a method for training a classification model, including:

obtaining, by a terminal, a training sample, the training sample including a training parameter and a true classification corresponding to the training parameter;

performing, by the terminal, classification training on an initial classification model by using the training parameter, to obtain a predicted classification;

determining, by the terminal, a residual between the true classification and the predicted classification according to a gradient loss function included in the initial classification model, the gradient loss function including a distance factor representing a distance between a first category and a second category, the first category being a category to which the predicted classification belongs, and the second category being a category to which the true classification belongs; and modifying, by the terminal, the initial classification model according to the residual to obtain a final classification model.

In a possible implementation, the performing, by the terminal, classification training on an initial classification model by using the training parameter, to obtain a predicted classification includes:

performing, by the terminal, iterative calculation on the initial classification model by using the training parameter, to obtain a predicted classification generated by a classification model used in each iteration;

correspondingly, the determining, the terminal, a residual between the true classification and the predicted classification according to a gradient loss function included in the initial classification model includes:

determining, by the terminal according to the gradient loss function included in the initial classification model, a residual between the true classification and the predicted classification generated in each iteration; and correspondingly, modifying, by the terminal, the initial classification model according to the residual to obtain a final classification model includes:

modifying, by the terminal according to a residual determined in the $M^{th}$ iteration, a classification model used in the $M^{th}$ iteration to obtain a classification model used in the $(M+1)^{th}$ iteration, and obtaining the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In a possible implementation, the determining, by the terminal according to the gradient loss function included in the initial classification model, a residual between the true classification and the predicted classification generated in each iteration includes:

determining, by the terminal according to the training parameter, the true classification, and the distance factor representing the difference between the category to which the true classification belongs and a category to which a predicted classification in each iteration belongs, a residual between the true classification and the predicted classification in each iteration.

In a possible implementation, the determining, by the terminal according to the training parameter, the true classification, and the distance factor representing the difference between the category to which the true classification belongs and a category to which a predicted classification in each iteration belongs, a residual between the true classification and the predicted classification in each iteration includes:

determining, by the terminal, a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) \Big/ \sum_{l=1}^{K} \exp(F'_l(x_i)), \text{ and}$$

$$F'_k(x_i) = D_{yk} * F_k(x_i),$$

where $x_i$ is the parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F'_k(x_i)$ is a modification prediction function of the $k^{th}$ iteration, $F'_l(x_i)$ is a modification prediction function of the $l^{th}$ iteration, and a value of l ranges from 1 to K, where K is a quantity of classes of the true classification.

An embodiment of this application provides a method for classifying data including:

receiving, by a terminal, to-be-classified data;

classifying, by the terminal, the to-be-classified data by using a target classification model, to obtain a classification result, the target classification model being a final classification model obtained by using the method for training a classification model according to any one of the possible implementations of the foregoing method for training a classification model; and outputting, by the terminal, the classification result.

Compared with the existing technology in which classification model training is inaccurate and a training speed is slow, in the method for training a classification model provided in the embodiments of the present disclosure, the training sample includes a training parameter and a true classification corresponding to the training parameter, after classification training is performed on an initial classification model to obtain a predicted classification, the predicted classification and the true classification may be different, and therefore a distance factor may be introduced in a gradient loss function of the initial classification model, and the distance factor is used for representing a distance between a category to which the true classification belongs and a category to which the predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Further, after the classification accuracy of the classification model is improved, when the classification model is used for classifying data, accuracy of data classification is also improved.

DESCRIPTION OF EMBODIMENTS

Figure 1:
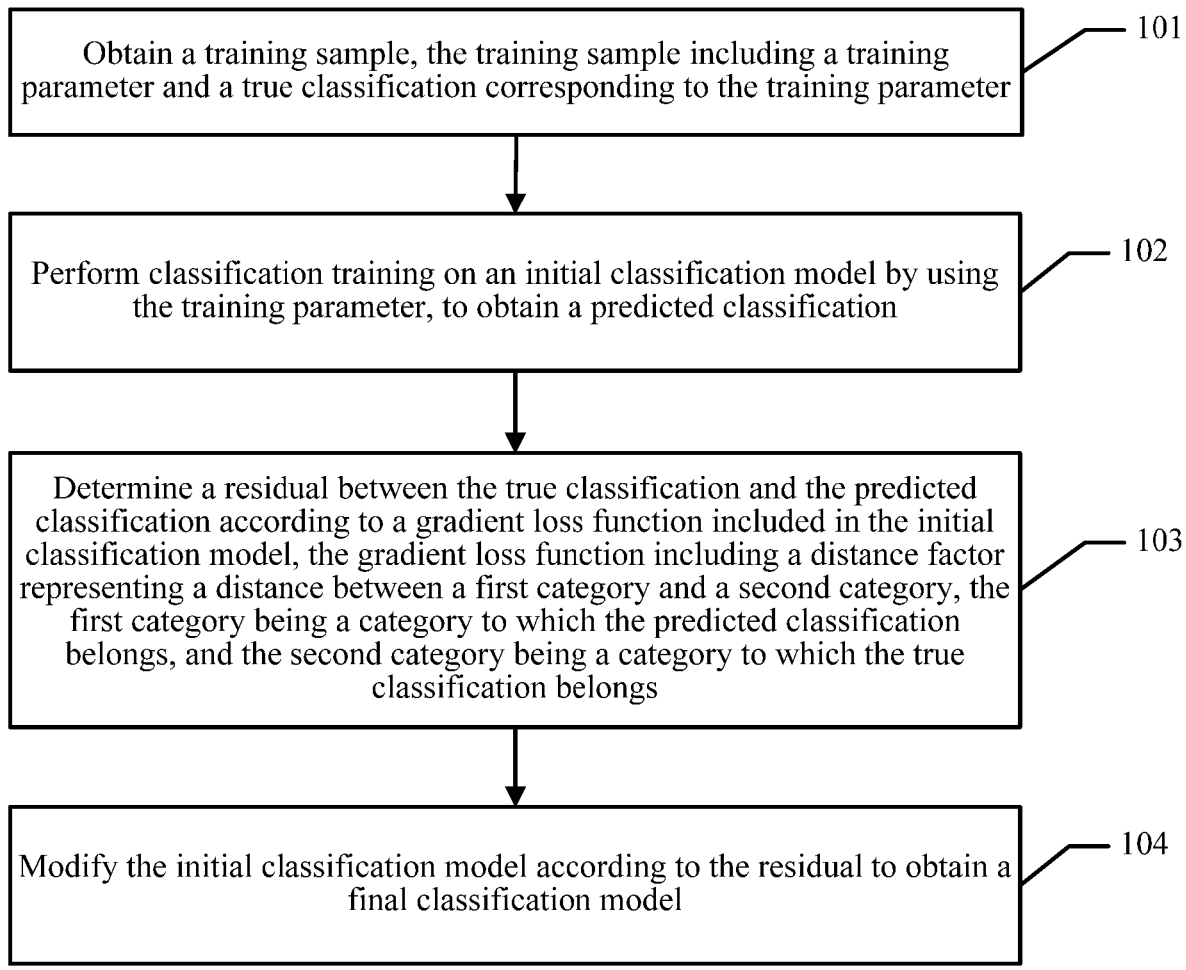
FIG. 1 is a schematic diagram of an embodiment of a method for training a classification model according to an embodiment of this application.

The embodiments of this application provide a method for training a classification model, and a distance factor is introduced in a gradient loss function of an initial classification model. In this way, when different classification errors are generated, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Embodiments of this application further provide a corresponding method for classifying data, and classifying data by using a classification model obtained by training in the foregoing method can improve accuracy of data classification. The embodiments of this application further provide corresponding apparatuses. Details descriptions are separately provided below.

The following describes the technical solutions in embodiments of this application with reference to the accompanying drawings in the embodiments of this application. Apparently, the described embodiments are some embodiments of this application rather than all of the embodiments.

Data classification is usually to merge data having common attributes or features together. Data classification is widely applied to a plurality of different fields and technologies. For example, in an information promotion aspect, an education background of a user may be classified according to historical browsing information of the user in a network, or an age of the user may be classified according to the historical browsing information of the user in the network, so that it is easy to push or send some information suitable for the education background of the user or the age for the user to implement an accurate push.

When data is classified, a pre-trained classification model may be usually used for classifying the data, xgboost is a currently used classification model of relatively high classification accuracy, and a full name of xgboost is eXtreme Gradient Boosting. A Boosting classifier belongs to an integrated learning model, and its basic idea is combining hundreds of tree models of relatively low classification accuracy into a model of quite high accuracy. The model iterates continuously, and generates a new tree in each iteration. An xgboost model uses an idea of gradient descent, that is, based on all trees generated in iterations before, when a new tree is generated in each iteration, to continue to iterate towards a direction of a minimized given objective function.

Because an xgboost classification model is trained by using a current method, predicted classifications obtained by using a training sample may be different, that is, different classification errors occur, but in the current method for training the xgboost classification model, residuals generated for the different classification errors are the same. Using education backgrounds as an example, the education backgrounds may be classified into seven categories: a doctoral degree, a master's degree, a bachelor degree, a college degree, a high school degree, a junior school degree, and an elementary school degree. Classifying a training sample of an elementary school student into a junior school degree and classifying a training sample of an elementary school student into a doctoral degree are different classification errors of the training sample of the elementary school student that occur, but residuals generated by the two errors are equal, and a modification direction of the classification model is not easy to be determined. Therefore, to resolve a problem that residuals generated by classifying a training sample to different categories are equal, consequently different classification errors cannot be specially modified according to the residuals, consequently a training speed of a modification model is low, the embodiments of this application provide a method for training a classification model to quickly obtain a classification model of high accuracy by training.

Classification and regression are essentially the same in a mathematical model, a difference of the both is that classification processes discrete data and regression processes continuous data. Therefore, a classification model provided in the embodiments of this application is actually a classification and regression model, and the classification model is not limited to being applied to data classification, and may also be applied to data regression.

Referring to FIG. 1, an embodiment of a method for training a classification model provided in an embodiment of this application includes:

101. Obtaining a training sample, the training sample including a training parameter and a true classification corresponding to the training parameter.

Training a classification model needs a large quantity of training samples, each training sample may include a training parameter used for training the classification model and a true classification, the true classification may a classification direction corresponding to the training parameter, the true classification is accurate, training parameters may be a series of parameters associated with true classifications, and the training parameters correspond to the true classifications. Using training an age classification model as an example, the training parameters may be parameters of types such as a desirable color, a sports type, food preference, and dressing preference, and the true classifications may be values of age such as 18, 30, and 50. If using an education background as an example, the training parameters may be parameters of types such as a type of reading, a type of joined activity, and a type of a subscribed official account, and the true classifications may be a doctoral degree, a master's degree, a bachelor degree, a college degree, a high school degree, a junior school degree, and an elementary school degree.

102. Performing classification training on an initial classification model by using the training parameter, to obtain a predicted classification.

The initial classification model may be developed by a developer in advance and stored into a computer, the training parameter is input into the computer, and the initial classification model may start an iteration process.

In this embodiment of this application, in each iteration, a predicted classification generated by a classification model used in the iteration may be generated, and the predicted classification in each iteration may be used for optimizing a classification model used in a next iteration.

103. Determining a residual between the true classification and the predicted classification according to a gradient loss function included in the initial classification model, the gradient loss function including a distance factor representing a distance between a first category and a second category, the first category being a category to which the predicted classification belongs, and the second category being a category to which the true classification belongs.

A category in this embodiment of this application may be represented in a form of a value label. For example, that the category is an education background is used as an example. Category labels corresponding to education background categories are shown in the following table 1.

TABLE 1 category label table

| Categories | Labels |
| --- | --- |
| Doctoral degree | 0 |
| Master's degree | 1 |
| Bachelor degree | 2 |
| College degree | 3 |
| High school degree | 4 |
| Junior school degree | 5 |
| Elementary school degree | 6 |

Certainly, Table 1 herein is only for illustration, a classification of education background categories is not limited to these, and may further include categories such as a kindergarten degree, a post-doctoral degree, and a technical secondary school degree. However, principles are the same regardless of a quantity of categories, and each category corresponds to a category label.

If the training parameter is an elementary school student, a true classification of the elementary school student is an elementary school degree, a label value of the elementary school is 6, if the elementary school student is classified into a doctoral degree, a predicted classification is the doctoral degree, a label value of the doctoral degree is 0, and a value of a distance factor representing a distance between the elementary school degree and the doctoral degree is 6. If the elementary school student is classified into a junior school student, the predicted classification is a junior school degree, a label value of the junior school degree is 5, and a value of a distance factor representing a distance between the elementary school degree and the junior school degree is 1.

It may be learned that when a classification model is used, distance factors generated by two classification errors, that is, incorrectly classifying the elementary school student as the junior school degree and incorrectly classifying the elementary school student as the doctoral degree, are different, so that gradient loss functions of the both are different, and further residuals between the true classification and the predicted classification that are determined according to the gradient loss functions are different. Residuals of different values correspond to classification errors of different degrees, and therefore the initial classification model may be specifically modified according to the residuals of the different values.

104. Modifying the initial classification model according to the residual to obtain a final classification model.

Compared with the existing technology in which classification model training is inaccurate and a training speed is slow, in the method for training a classification model provided in the embodiments of the present disclosure, the training sample includes a training parameter and a true classification corresponding to the training parameter, after classification training is performed on an initial classification model to obtain a predicted classification, the predicted classification and the true classification may be different, and therefore a distance factor may be introduced in a gradient loss function of the initial classification model, and the distance factor is used for representing a distance between a category to which the true classification belongs and a category to which the predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Further, after the classification accuracy of the classification model is improved, when the classification model is used for classifying data, accuracy of data classification is also improved.

In this embodiment, the final classification model is obtained by continuously iterating and modifying the initial classification model by using the training sample. Therefore, the performing classification training on an initial classification model by using the training parameter, to obtain a predicted classification may include:

performing iterative calculation on the initial classification model by using the training parameter, to obtain a predicted classification generated by a classification model used in each iteration;

correspondingly, the determining a residual between the true classification and the predicted classification according to a gradient loss function included in the initial classification model may include:

determining a residual between the true classification and a prediction result in each iteration according to a gradient loss function included in the initial classification model; and correspondingly, the modifying the initial classification model according to the residual to obtain a final classification model may include:

modifying, according to a residual determined in the $M^{th}$ iteration, a classification model used in the $M^{th}$ iteration to obtain a classification model used in the $(M+1)^{th}$ iteration, and obtaining the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In this embodiment of this application, in each iteration, a predicted classification generated by a classification model used in the iteration may be obtained. For example, the iteration is the $M^{th}$ iteration, a residual of the $M^{th}$ iteration may be determined according to a predicted classification and a true classification generated by the classification model used in the $M^{th}$ iteration, and the residual of the $M^{th}$ iteration is used for modifying the classification model used in the $M^{th}$ iteration, to implement an optimization of the classification model. For example, if M=1, a training parameter is used for training an initial classification model to generate a predicted classification in the first iteration, a residual of the first iteration is determined according to the predicted classification of the first iteration and a true classification, the residual of the first iteration is used for optimizing the initial classification model, to obtain a classification model used in the second iteration, and then an iteration operation of the second iteration is then performed.

In an example, the determining, according to the gradient loss function included in the initial classification model, a residual between the true classification and the predicted classification generated in each iteration includes:

determining, according to the training parameter, the true classification, and the distance factor representing the difference between the category to which the true classification belongs and a category to which a predicted classification in each iteration belongs, a residual between the true classification and the predicted classification in each iteration.

In an implementation process, when a residual between the true classification and the predicted classification in each iteration is determined according to the training parameter, the true classification, and the distance factor representing the difference between the category to which the true classification belongs and a category to which a predicted classification in each iteration belongs, a residual between a predicted classification generated in the $k^{th}$ iteration and the true classification may be specifically determined by using the following formulas:

$$\tilde{y}_{kk} == y_{ik} - p_k(x_i),$$

$$p_k(x_i) = \exp(F'_k(x_i)) / \sum_{l=1}^{K} \exp(F'_l(x_i)), \text{ and}$$

$$F'_k(x_i) = D_{yk} * F_k(x_i),$$

where $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, where K is a quantity of classes of the true classification.

It should be noted that the xgboost classification model does not introduce a distance factor (an original gradient loss function) in a gradient loss function to be trained, the prediction probability function of the $k^{th}$ iteration is $$p_k(x_i) = \exp(F_k(x_i)) / \sum_{l=1}^{K} \exp(F_l(x_i)),$$

and the following uses the original gradient loss function as an example to describe a residual calculation process in a case where a classification error occurs.

Stilling using education background classification in Table 1 as an example, there are three training samples below, as shown in Table 2.

TABLE 2 training samples of education background classification

| Samples | Labels | Education Backgrounds | Xgboost Identification Labels |
|---------|--------|----------------------|-------------------------------|
| $y_1$ | 6 | Elementary school Degree | $y_1 = (0, 0, 0, 0, 0, 0, 1)$ |
| $y_2$ | 5 | Junior School Degree | $y_2 = (0, 0, 0, 0, 0, 1, 0)$ |
| $y_3$ | 0 | Doctoral Degree | $y_3 = (1, 0, 0, 0, 0, 0, 0)$ |

Using a prediction process of the training sample $y_1$ of the elementary school student as an example, a predicted classification of the $(k-1)^{th}$ tree model is set to be $F_{k-1}(x)=(0, 0,0,0.3,0,0.8,0)$, a result of the predicted classification is predicting the elementary school student as the junior school degree, and a residual corresponding to the $k^{th}$ tree model is:

$$Target_k = y_1 - p_{k-1} =$$

$$(0, 0, 0, 0, 0, 0, 1) - (0.12, 0.12, 0.12, 0.16, 0.12, 0.26, 0.12) =$$

$$(-0.12, -0.12, -0.12, -0.16, -0.12, -0.26, 0.88).$$

The predicted classification is assumed to be $F_{k-1}(x)=(0.8,0,0,0.3,0,0,0)$, a result of the predicted classification is predicting the elementary school student as the doctoral degree, and the residual corresponding to the $k^{th}$ tree model is:

$$Target_k = y_1 - p_{k-1} =$$
$$(0, 0, 0, 0, 0, 0, 1) - (0.26, 0.12, 0.12, 0.16, 0.12, 0.12, 0.12) =$$
$$(-0.26, -0.12, -0.12, -0.16, -0.12, -0.26, 0.88).$$

It may be learned from the two results above, the residual obtained by the predicted classification to be the junior school degree and the residual obtained by the predicted classification to be the doctoral degree are equal in value and different only in positions in a vector.

Still using the prediction process of the training sample $y_1$ in Table 2 as an example, if a residual is calculated in a case where a classification error occurs in the gradient loss function in this embodiment of this application, a calculation process of the residual is as follows:

when the elementary school student is predicted as the junior school degree, $$F_{k-1}'(x) = D_{y_{k-1}} * F_{k-1}(x) = (1,1,1,1,1,1,1)^{-t} * (0,0,0,0.3,0,0.8,0) = (0,0,0,0.3,0,0.8,0)$$

a generated residual is:

$$Target_k = y_1 - p_{k-1} =$$
$$(0, 0, 0, 0, 0, 0, 1) - (0.12, 0.12, 0.12, 0.16, 0.12, 0.26, 0.12) =$$
$$(-0.12, -0.12, -0.12, -0.16, -0.12, -0.26, 0.88).$$

when the elementary school student is predicted as the doctoral degree, $$F_{k-1}'(x) = D_{y_{k-1}} * F_{k-1}(x) = (6,1,1,1,1,1,1)^{-t} * (0.8,0,0,0.3,0,0,0) = (4.8,0,0,0.3,0,0,0)$$

a generated residual is:

$$Target_k = y_1 - p_{k-1} =$$
$$(0, 0, 0, 0, 0, 0, 1) - (0.95, 0.008, 0.008, 0.01, 0.008, 0.008, 0.008) =$$
$$(-0.95, -0.008, -0.008, -0.01, -0.12, -0.008, 0.92).$$

$Target_k$ in the foregoing example of this application is $\tilde{y}_{k-1}$.

It may be learned by comparing the two results above, when a residual is calculated by using the gradient loss function in this embodiment of this application, different residuals may be generated for different classification errors, that is, the residual obtained by the predicted classification to be the junior school degree and the residual obtained by the predicted classification to be the doctoral degree are different. In this way, a modification target can be determined, facilitating a quick optimization of a classification model.

This embodiment of this application provides different residuals for different classification errors, that is, provides punishment of different costs, thereby improving accuracy of the xgboost classification model as a whole. This technical solution may be used for performing ordered classification such age and education background.

Figure 2:
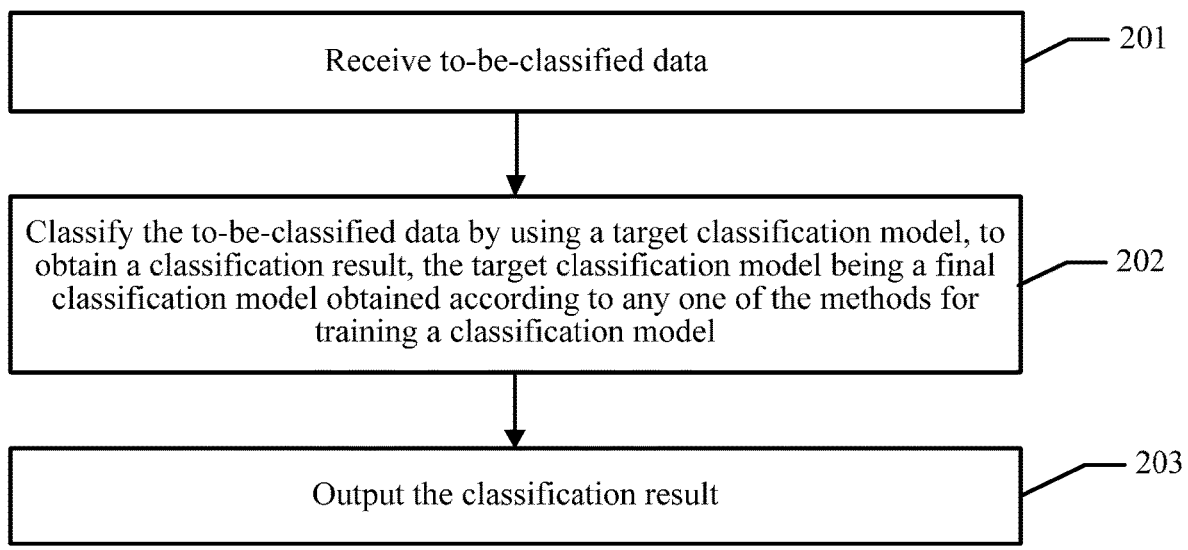
FIG. 2 is a schematic diagram of an embodiment of a method for classifying data according to an embodiment of this application.

Referring to FIG. 2, an embodiment of a method for classifying data provided in an embodiment of this application includes:

201. Receiving to-be-classified data.

202. Classifying the to-be-classified data by using a target classification model, to obtain a classification result, the target classification model being a final classification model obtained by using the method for training a classification model in the foregoing embodiment.

203. Outputting the classification result.

Compared with the existing technology in which classification model training is inaccurate and a training speed is slow, in the method for training a classification model provided in the embodiments of the present disclosure, the training sample includes a training parameter and a true classification corresponding to the training parameter, after classification training is performed on an initial classification model to obtain a predicted classification, the predicted classification and the true classification may be different, and therefore a distance factor may be introduced in a gradient loss function of the initial classification model, and the distance factor is used for representing a distance between a category to which the true classification belongs and a category to which the predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Further, after the classification accuracy of the classification model is improved, when the classification model is used for classifying data, accuracy of data classification is also improved.

Figure 3:
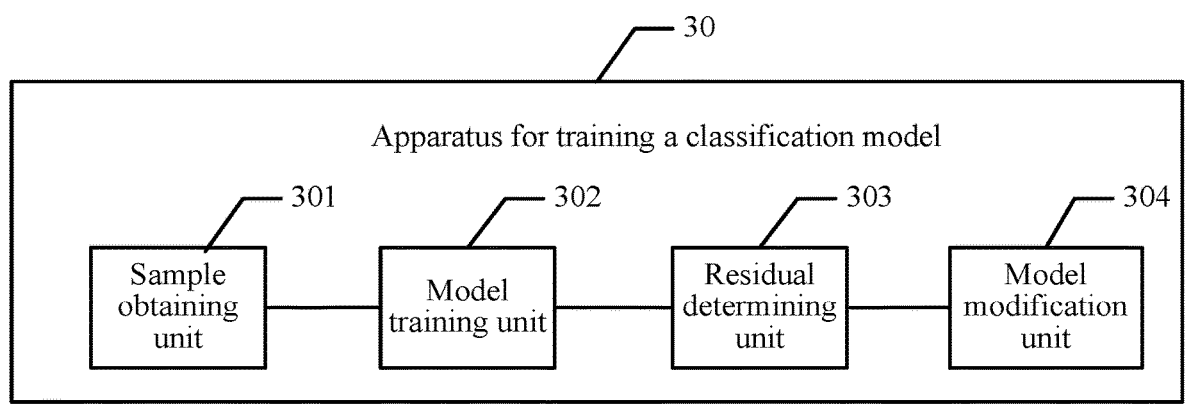
FIG. 3 is a schematic diagram of an embodiment of an apparatus for training a classification model according to an embodiment of this application.

Referring to FIG. 3, an embodiment of an apparatus 30 for training a classification model provided in an embodiment of this application includes:

a sample obtaining unit 301, configured to obtain a training sample, the training sample including a training parameter and a true classification corresponding to the training parameter;

a model training unit 302, configured to perform classification training on an initial classification model by using the training parameter obtained by using the sample obtaining unit 301, to obtain a predicted classification;

a residual determining unit 303, configured to determine, according to a gradient loss function included in the initial classification model, a residual between the true classification and the predicted classification trained by the model training unit 302, the gradient loss function including a distance factor representing a distance between a first category and a second category, the first category being a category to which the predicted classification belongs, and the second category being a category to which the true classification belongs; and a model modification unit 304, configured to modify, according to the residual determined by the residual determining unit 303, the initial classification model to obtain a final classification model.

In this embodiment of this application, the sample obtaining unit 301 obtains the training sample used for training a classification model, the training sample including the training parameter and the true classification corresponding to the training parameter; the model training unit 302 performs classification training the an initial classification model by using the training parameter obtained by using the sample obtaining unit 301, to obtain a predicted classification; the residual determining unit 303 determines, according to the gradient loss function included in the initial classification model, the residual between the true classification and the predicted classification trained by the model training unit 302, the gradient loss function including the distance factor representing the distance between the first category and the second category, the first category being a category to which the predicted classification belongs, and the second category being a category to which the true classification belongs; and the model modification unit 304 modifies, according to the residual determined by the residual determining unit 303, the initial classification model to obtain the final classification model.

Compared with the existing technology in which classification model training is inaccurate and a training speed is slow, in the method for training a classification model provided in the embodiments of the present disclosure, the training sample includes a training parameter and a true classification corresponding to the training parameter, after classification training is performed on an initial classification model to obtain a predicted classification, the predicted classification and the true classification may be different, and therefore a distance factor may be introduced in a gradient loss function of the initial classification model, and the distance factor is used for representing a distance between a category to which the true classification belongs and a category to which the predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Further, after the classification accuracy of the classification model is improved, when the classification model is used for classifying data, accuracy of data classification is also improved.

In an example, in another embodiment of the apparatus 30 for training a classification model provided in an embodiment of this application, the model training unit is configured to perform iterative calculation on the initial classification model by using the training parameter, to obtain a predicted classification generated by a classification model used in each iteration;

the residual determining unit is configured to determine, according to the gradient loss function included in the initial classification model, a residual between the true classification and the predicted classification generated in each iteration; and the model modification module is configured to modify, according to a residual determined in the $M^{th}$ iteration, a classification model used in the $M^{th}$ iteration to obtain a classification model used in the $(M+1)^{th}$ iteration, and obtain the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In an example, in another embodiment of the apparatus 30 for training a classification model provided in an embodiment of this application, the residual determining unit is configured to determine, according to the training parameter, the true classification, and the distance factor representing the difference between the category to which the true classification belongs and a category to which a predicted classification in each iteration belongs, a residual between the true classification and the predicted classification in each iteration.

The residual determining unit is further configured to determine a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) \Big/ \sum_{l=1}^{K} \exp(F'_l(x_i)), \text{ and}$$

$$F'_k(x_i) = D_{yk} * F_k(x_i),$$

where $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F'_k(x_i)$ is a modification prediction function of the $k^{th}$ iteration, $F'_l(x_i)$ is a modification prediction function of the $l^{th}$ iteration, and a value of l ranges from 1 to K, where K is a quantity of classes of the true classification.

For the apparatus for training a classification model provided in the embodiments of this application, refer to descriptions of the foregoing method for understanding, and details are not described herein again.

Figure 4:
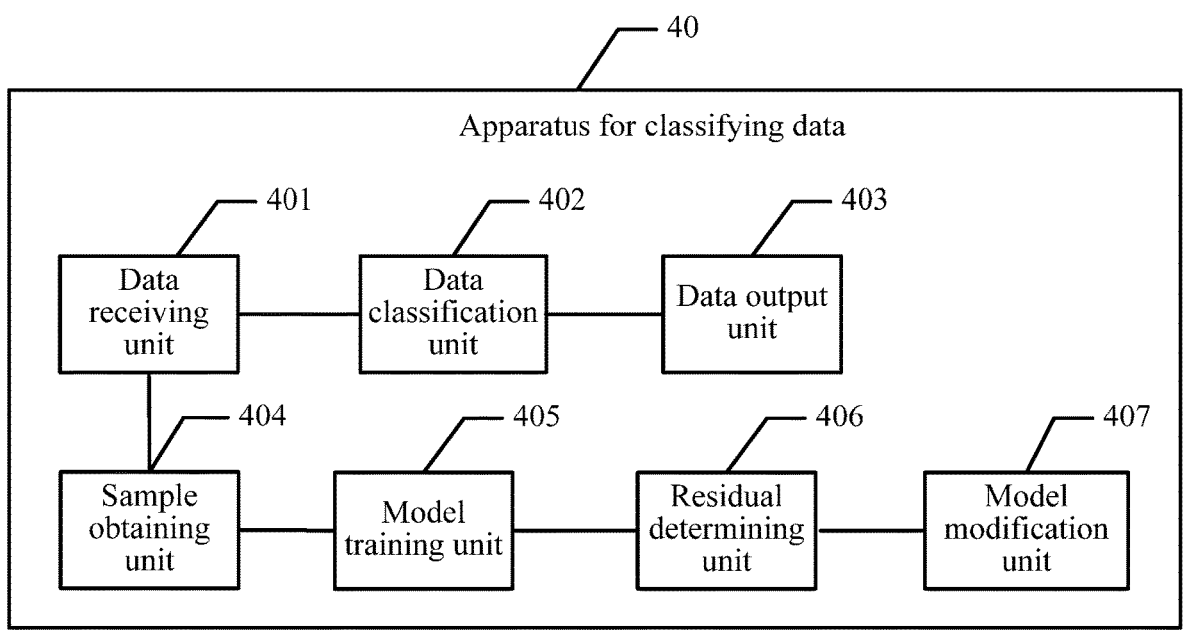
FIG. 4 is a schematic diagram of an embodiment of an apparatus for classifying data according to an embodiment of this application.

Referring to FIG. 4, an embodiment of an apparatus 40 for classifying data provided in an embodiment of this application includes:

a data receiving unit 401, configured to receive to-be-classified data;

a data classification unit 402, configured to classify, by using a target classification model, the to-be-classified data received by the data receiving unit 401, to obtain a classification result, the target classification model being a final classification model obtained according to the foregoing apparatus for training a classification model; and a data output unit 403, configured to output the classification result obtained by the data classification unit 402 by means of classification.

In this embodiment of this application, the data receiving unit 401 receives the to-be-classified data; the data classification unit 402 classifies, by using the target classification model, the to-be-classified data received by the data receiving unit 401, to obtain the classification result, the target classification model being the final classification model obtained according to the foregoing apparatus for training a classification model; and the data output unit 403 outputs the classification result obtained by the data classification unit 402 by means of classification. The apparatus for classifying data provided in this embodiment of this application improves accuracy of data classification because classification accuracy of a classification model is improved.

It should be noted that the target classification model in this embodiment may be obtained according to any embodiment of FIG. 3. Therefore, the apparatus 40 in this embodiment may include a unit included in any embodiment of FIG. 3.

In the embodiments of this application, apparatuses for training a classification model may be completed by a computing device such as a computer. The following describes, with reference to a form of the computing device, a process in which the computing device is configured to train a classification model.

Figure 5:
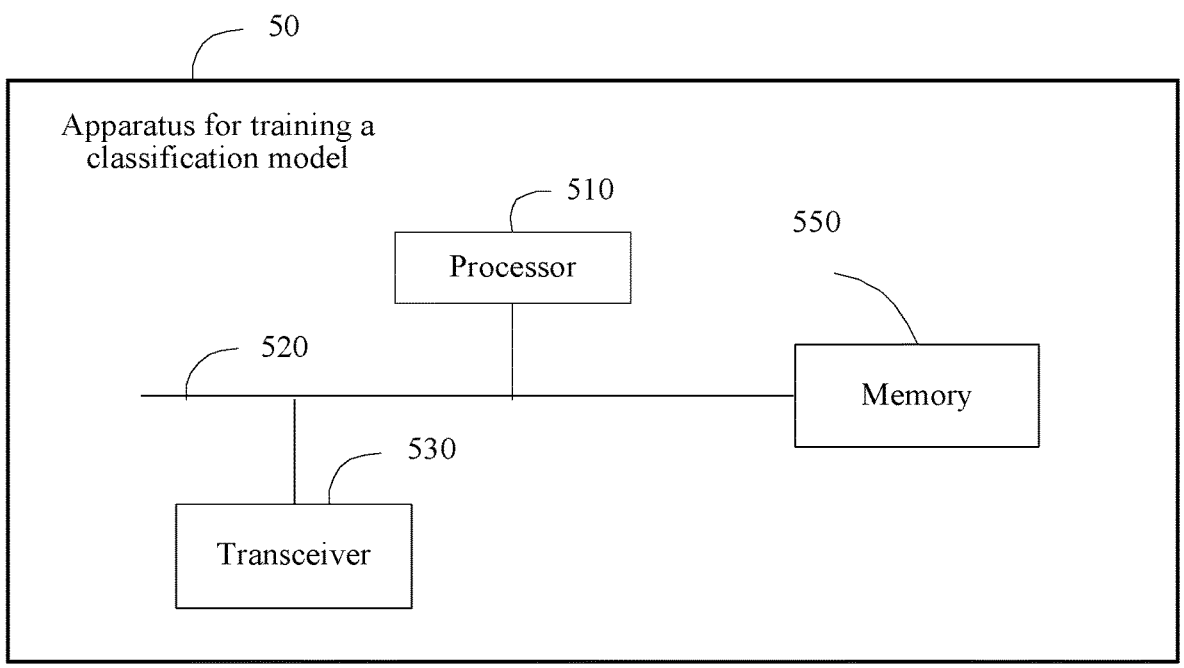
FIG. 5 is a schematic diagram of another embodiment of an apparatus for training a classification model according to an embodiment of this application.

FIG. 5 is a schematic structural diagram of an apparatus 50 for training a classification model according to an embodiment of this application. The apparatus 50 for training a classification model includes a processor 510, a memory 550, and a transceiver 530. The memory 550 may include a read-only memory and a random access memory, and provide an operation instruction and data for the processor 510. A part of the memory 550 may further include a non-volatile random access memory (NVRAM).

In some implementations, the memory 550 stores the following element, an executable module, or a data structure, or a subset thereof, or an extension set thereof.

In this embodiment of this application, by invoking the operating instruction (the operating instruction may be stored in an operating system) stored by the memory 550, a training sample is obtained by using the transceiver 530, the training sample including a training parameter and a true classification corresponding to the training parameter;

classification training is performed on an initial classification model by using the training parameter, to obtain a predicted classification;

a residual between the true classification and the predicted classification is determined according to a gradient loss function included in the initial classification model, the gradient loss function including a distance factor representing a distance between a first category and a second category, the first category being a category to which the predicted classification belongs, and the second category being a category to which the true classification belongs; and the initial classification model is modified according to the residual to obtain a final classification model.

Compared with the existing technology in which classification model training is inaccurate and a training speed is slow, in the method for training a classification model provided in the embodiments of the present disclosure, the training sample includes a training parameter and a true classification corresponding to the training parameter, after classification training is performed on an initial classification model to obtain a predicted classification, the predicted classification and the true classification may be different, and therefore a distance factor may be introduced in a gradient loss function of the initial classification model, and the distance factor is used for representing a distance between a category to which the true classification belongs and a category to which the predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Further, after the classification accuracy of the classification model is improved, when the classification model is used for classifying data, accuracy of data classification is also improved.

The processor 510 controls an operation of the apparatus 50 for training a classification model, and the processor 510 may also be referred to as a CPU. The memory 550 may include a read-only memory and a random access memory, and provides an instruction and data for the processor 510. A part of the memory 550 may further include an NVRAM. In specific application, components of the apparatus 50 for training a classification model are coupled together by using a bus system 520, where in addition to a data bus, the bus system 520 may include a power bus, a control bus, a status signal bus, and the like. However, for ease of clear description, all types of buses in the diagram are marked as the bus system 520.

The methods disclosed in the foregoing embodiments of this application may be applied to the processor 510, or may be implemented by the processor 510. The processor 510 may be an integrated circuit chip and has a signal processing capability. In an implementation process, steps in the foregoing methods may be implemented through a hardware integrated logical circuit in the processor 510, or an instruction in the form of software. The processor 510 may be a general-purpose processor, a digital signal processor (DSP), an application-specific integrated circuit (ASIC), a field programmable gate array (FPGA), another programmable logic component, a discrete gate or a transistor logic device, and a discrete hardware component, and may implement or perform methods, steps, and logical block diagrams disclosed in the embodiments of this application. The general-purpose processor may be a micro-processor, or the processor may also be any conventional processor or the like. The steps in the method disclosed in the embodiments of this application may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 550, and the processor 510 reads information in the memory 550 and performs the steps of the foregoing methods in combination with hardware of the processor.

In an example, the processor 510 is configured to:

performing iterative calculation on the initial classification model by using the training parameter, to obtain a predicted classification generated by a classification model used in each iteration;

determining, according to the gradient loss function included in the initial classification model, a residual between the true classification and the predicted classification generated in each iteration; and modifying, according to a residual determined in the $M^{th}$ iteration, a classification model used in the $M^{th}$ iteration to obtain a classification model used in the $(M+1)^{th}$ iteration, and obtaining the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

In an example, the processor 510 is configured to:

determining, according to the training parameter, the true classification, and the distance factor representing the difference between the category to which the true classification belongs and a category to which a predicted classification in each iteration belongs, a residual between the true classification and the predicted classification in each iteration.

In an implementation process, the processor 510 may determine a residual between a predicted classification generated in the $k^{th}$ iteration and the true classification by using the following formulas:

$$\tilde{y}_{ik} = y_{ik} - p_k(x_i),$$

$$p_k(x_i) = \exp(F'_k(x_i)) \Big/ \sum_{l=1}^{K} \exp(F'_l(x_i)), \text{ and}$$

$$F'_k(x_i) = D_{yk} * F_k(x_i),$$

where $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is a distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, where K is a quantity of classes of the true classification.

For the apparatus for training a classification model provided in the embodiments of this application, refer to related descriptions in FIG. 1 to FIG. 4 for understanding, and details are not described herein again.

Figure 6:
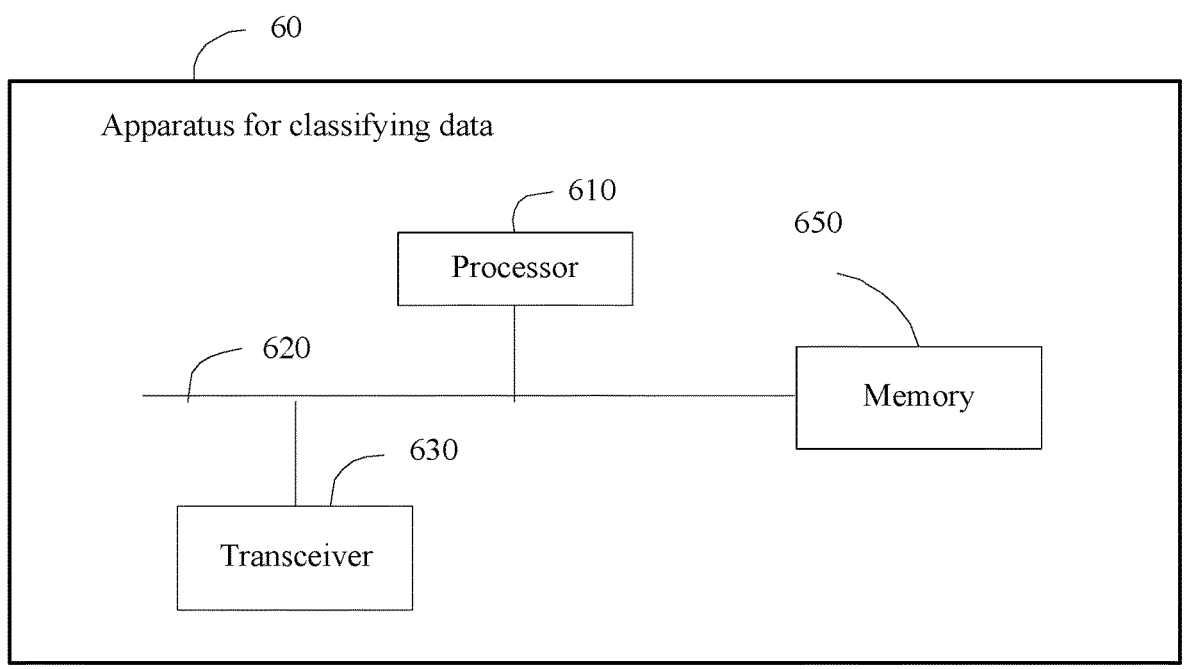
FIG. 6 is a schematic diagram of another embodiment of an apparatus for classifying data according to an embodiment of this application.

FIG. 6 is a schematic structural diagram of an apparatus 60 for classifying data according to an embodiment of this application. The apparatus 60 for classifying data includes a processor 610, a memory 650, and a transceiver 630. The memory 650 may include a read-only memory and a random access memory, and provide an operation instruction and data for the processor 610. A part of the memory 650 may further include an NVRAM.

In some implementations, the memory 650 stores the following element, an executable module, or a data structure, or a subset thereof, or an extension set thereof.

In this embodiment of this application, by invoking the operating instruction (the operating instruction may be stored in an operating system) stored by the memory 650, to-be-classified data is received by using the transceiver 630;

the to-be-classified data is classified by using a target classification model, to obtain a classification result, the target classification model being a final classification model obtained according to the apparatus 50 for training a classification model in the foregoing embodiment; and the classification result is output by using the transceiver 630.

Compared with the existing technology in which accuracy of data classification is not high enough, the apparatus for classifying data provided in this embodiment of this application improves accuracy of data classification because classification accuracy of a classification model is improved.

The processor 610 controls an operation of the apparatus 60 for classifying data, and the processor 610 may also be referred to as a CPU. The memory 650 may include a read-only memory and a random access memory, and provides an instruction and data for the processor 610. A part of the memory 650 may further include an NVRAM. In specific application, components of the apparatus 60 for classifying data are coupled together by using a bus system 620, where in addition to a data bus, the bus system 620 may include a power bus, a control bus, a status signal bus, and the like. However, for ease of clear description, all types of buses in the diagram are marked as the bus system 620.

The methods disclosed in the foregoing embodiments of this application may be applied to the processor 610, or may be implemented by the processor 610. The processor 610 may be an integrated circuit chip and has a signal processing capability. In an implementation process, steps in the foregoing methods may be implemented through a hardware integrated logical circuit in the processor 610, or an instruction in the form of software. The processor 610 may be a general-purpose processor, a DSP, an ASIC, an FPGA, another programmable logic component, a discrete gate or a transistor logic device, and a discrete hardware component, and may implement or perform methods, steps, and logical block diagrams disclosed in the embodiments of this application. The general-purpose processor may be a microprocessor, or the processor may also be any conventional processor or the like. The steps in the method disclosed in the embodiments of this application may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 650, and the processor 610 reads information in the memory 650 and performs the steps of the foregoing methods in combination with hardware of the processor.

It should be noted that the target classification model in this embodiment may be obtained according to any embodiment of FIG. 5. Therefore, the processor 610 in this embodiment may execute an operation instruction executed by any embodiment of FIG. 5.

For the apparatus for classifying data provided in the embodiments of this application, refer to related descriptions in FIG. 1 to FIG. 4 for understanding, and details are not described herein again.

An embodiment of this application further provides a computer program product including an instruction, enabling, when running on a computer, the computer to perform the method for training a classification model according to any one of the foregoing embodiments.

An embodiment of this application further provides a computer program product including an instruction, enabling, when running on a computer, the computer to perform the method for classifying data according to any one of the foregoing embodiments.

A person of ordinary skill in the art may understand that all or some of the steps of the methods in the embodiments may be completed by a program instructing relevant hardware. The program may be stored in a computer readable storage medium. The storage medium may include: a ROM, a RAM, a magnetic disk, or an optical disc.

A method and an apparatus for training a classification model, and a method and an apparatus for classifying data that are provided in the embodiment of this application are described above in detail. A distance factor is introduced in a gradient loss function of an initial classification model, and the distance factor represents a distance between a category to which a true classification belongs and a category to which a predicted classification belongs. In this way, when different classification errors are generated, that is, when difference degrees between the predicted classification and the true classification are different, corresponding distance factors are different so that gradient loss functions are different, and residuals between the true classification and the predicted classification that are determined according to the gradient loss functions are different. Residuals of different values correspond to classification errors of different degrees, and therefore the initial classification model may be specifically modified according to the residuals of the different values, thereby quickly improving accuracy of a classification model. Embodiments of this application further improve a corresponding method and apparatus for classifying data.

In the specification, specific examples are used for illustrating principles and implementations of this application. The foregoing descriptions of the embodiments are merely provided for ease of understanding the methods and core ideas of this application. Meanwhile, a person of ordinary skill in the art may make modifications to the specific implementations and application scopes according to the idea of this application. In conclusion, the content of the specification shall not be construed as a limitation to this application.

What is claimed is:

1. A method for training a classification model for education level classification, the method comprising:
   obtaining, by a device comprising a memory storing instructions and a processor in communication with the memory, a training sample, the training sample comprising a training parameter and a true classification corresponding to the training parameter, wherein the training parameter comprises the following parameters:
      a type of reading;
      a type of joined activity; and
      a subscribed official account;
   performing, by the device, classification training on an initial classification model by using the training parameter, to obtain a predicted classification;
   determining, by the device, a residual between the true classification and the predicted classification according to a gradient loss function of the initial classification model, the gradient loss function being based on a modification prediction function which is modified from a prediction function according to a distance vector, wherein:
      the number of elements in the distance vector equals to the number of education level classifications; one of the elements in the distance vector represents a distance factor; the distance factor represents a distance between a first category and a second category; rest of the elements in the distance vector are same constant numbers; and
      the first category and the second category each comprises the following categories:
         a doctoral degree category;
         a master's degree category;
         a bachelor degree category;
         a college degree category;
         a high school degree category;
         a junior high school degree category; and
         an elementary school degree category;
      the doctoral degree category, the master's degree category, the bachelor degree category, the college degree category, the high school degree category, the junior high school degree category, and the elementary school degree category correspond to label values following a sequential order; and
      the distance factor is based on a difference between a label value of the first category and a label value of the second category;
   modifying, by the device, the initial classification model according to the residual to obtain a final classification model.

2. The method according to claim 1, further comprising:
   receiving, by the device, to-be-classified data;
   classifying, by the device, the to-be-classified data by using the final classification model; and
   outputting, by the device, the classification result.

3. The method according to claim 1, wherein:
   the performing classification training on an initial classification model by using the training parameter, to obtain the predicted classification comprises:
      performing, by the device, iterative calculation on the initial classification model by using the training parameter, to obtain a predicted classification generated by a classification model used in each iteration;
   the determining the residual between the true classification and the predicted classification according to the gradient loss function of the initial classification model comprises:
      determining, by the device according to the gradient loss function of the initial classification model, a residual between the true classification and the predicted classification generated in each iteration; and
   the modifying the initial classification model according to the residual to obtain the final classification model comprises:
      modifying, by the device according to a residual determined in the $M^{th}$ iteration, a classification model used in the $M^{th}$ iteration to obtain a classification model used in the $(M+1)^{th}$ iteration, and
      obtaining, by the device, the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

4. The method according to claim 3, further comprising:
   receiving, by the device, to-be-classified data;
   classifying, by the device, the to-be-classified data by using the final classification model; and
   outputting, by the device, the classification result.

5. The method according to claim 3, wherein the determining, according to the gradient loss function of the initial classification model, the residual between the true classification and the predicted classification generated in each iteration comprises:
   determining, by the device, according to the training parameter, the true classification, and the distance vector which includes the distance factor representing the difference between the category to which the true classification belongs and a category to which a predicted classification in each iteration belongs, a residual between the true classification and the predicted classification in each iteration.

6. The method according to claim 5, wherein the determining, according to the training parameter, the true classification, and the distance vector which includes the distance factor representing the difference between the category to which the true classification belongs and the category to which the predicted classification in each iteration belongs, the residual between the true classification and the predicted classification in each iteration comprises:
   determining, by the device, a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) \bigg/ \sum_{l=1}^{K} \exp(F'_l(x_i)), \text{ and}$$

$$F'_k(x_i) = D_{yk} * F_k(x_i),$$

wherein
   $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is the distance vector which includes the distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, wherein K is a quantity of classes of the true classification.

7. The method according to claim 6, further comprising:
   receiving, by the device, to-be-classified data;
   classifying, by the device, the to-be-classified data by using the final classification model; and
   outputting, by the device, the classification result.

8. An apparatus for training a classification model for education level classification, comprising:
   a memory storing instructions; and
   a processor in communication with the memory, wherein, when the processor executes the instructions, the processor is configured to cause the apparatus to:
      obtain a training sample, the training sample comprising a training parameter and a true classification corresponding to the training parameter, wherein the training parameter comprises the following parameters:
         a type of reading;
         a type of joined activity; and
         a subscribed official account;
      perform classification training on an initial classification model by using the training parameter, to obtain a predicted classification;
      determine, according to a gradient loss function of the initial classification model, a residual between the true classification and the predicted classification, the gradient loss function being based on a modification prediction function which is modified from a prediction function according to a distance vector, wherein:
         the number of elements in the distance vector equals to the number of education level classifications; one of the elements in the distance vector represents a distance factor; the distance factor represents a distance between a first category and a second category; rest of the elements in the distance vector are same constant numbers; and
         the first category and the second category each comprises the following categories:
            a doctoral degree category;
            a master's degree category; p4 a bachelor degree category;
            a college degree category;
            a high school degree category;
            a junior high school degree category; and
            an elementary school degree category;
         the doctoral degree category, the master's degree category, the bachelor degree category, the college degree category, the high school degree category, the junior high school degree category, and the elementary school degree category correspond to label values following a sequential order; and
         the distance factor is based on a difference between a label value of the first category and a label value of the second category; and
      modify, according to the residual, the initial classification model to obtain a final classification model.

9. The apparatus according to claim 8, wherein, when the processor executes the instructions, the processor is further configured to cause the apparatus to:
   receive to-be-classified data;
   classify the to-be-classified data by using the final classification model; and
   output the classification result.

10. The apparatus according to claim 8, wherein:
   when the processor is configured to cause the apparatus to perform classification training on the initial classification model by using the training parameter obtained by using the sample obtaining unit, to obtain the predicted classification, the processor is configured to cause the apparatus to:
      perform iterative calculation on the initial classification model by using the training parameter, to obtain a predicted classification generated by a classification model used in each iteration;
   when the processor is configured to cause the apparatus to determine, according to the gradient loss function of the initial classification model, the residual between the true classification and the predicted classification, the processor is configured to cause the apparatus to:
      determine, according to the gradient loss function of the initial classification model, a residual between the true classification and the predicted classification generated in each iteration; and
   when the processor is configured to cause the apparatus to modify, according to the residual, the initial classification model to obtain the final classification model, the processor is configured to cause the apparatus to:
      modify, according to a residual determined in the $M^{th}$ iteration, a classification model used in the $M^{th}$ iteration to obtain a classification model used in the $(M+1)^{th}$ iteration, and
      obtain the final classification model by means of at least one iterative modification, the classification model used in the $M^{th}$ iteration being obtained by modifying a classification model used in the $(M-1)^{th}$ iteration according to a residual determined in the (M−1)$^{th}$ iteration, and M being a positive integer greater than 1.

11. The apparatus according to claim 10, wherein, when the processor executes the instructions, the processor is further configured to cause the apparatus to:
receive to-be-classified data;
classify the to-be-classified data by using the final classification model; and
output the classification result.

12. The apparatus according to claim 10, wherein, when the processor is configured to cause the apparatus to determine, according to the gradient loss function of the initial classification model, the residual between the true classification and the predicted classification generated in each iteration, the processor is configured to cause the apparatus to:
determine, according to the training parameter, the true classification, and the distance vector which includes the distance factor representing the difference between the category to which the true classification belongs and a category to which a predicted classification in each iteration belongs, a residual between the true classification and the predicted classification in each iteration.

13. The apparatus according to claim 12, wherein, when the processor is configured to cause the apparatus to determine, according to the training parameter, the true classification, and the distance vector which includes the distance factor representing the difference between the category to which the true classification belongs and the category to which the predicted classification in each iteration belongs, the residual between the true classification and the predicted classification in each iteration, the processor is configured to cause the apparatus to:
determine a residual between a predicted classification generated in the k$^{th}$ iteration and the true classification by using the following formulas:

$$\tilde{y}_{ik} == y_{ik} - p_k(x_i),$$

$$p_k(x_i) = \exp(F'_k(x_i)) / \sum_{l=1}^{K} \exp(F'_l(x_i)), \text{ and}$$

$$F'_k(x_i) = D_{yk} * F_k(x_i),$$

wherein
$x_i$ is the training parameter, i is a positive integer greater than 1, $y_{ik}$ is the true classification, $\tilde{y}_{ik}$ is the residual between the predicted classification generated in the k$^{th}$ iteration and the true classification, $p_k(x_i)$ is a prediction probability function of the k$^{th}$ iteration, $F_k(x_i)$ is a prediction function of the k$_{th}$ iteration, $D_{yk}$ is the distance vector which includes the distance factor representing a distance between the category to which the true classification belongs and a category to which the predicted classification of the k$^{th}$ iteration belongs, $F_k'(x_i)$ is a modification prediction function of the k$^{th}$ iteration, $F_l'(x_i)$ is a modification prediction function of the l$^{th}$ iteration, and a value of l ranges from 1 to K, wherein K is a quantity of classes of the true classification.

14. The apparatus according to claim 13, wherein, when the processor executes the instructions, the processor is further configured to cause the apparatus to:
receive to-be-classified data;
classify the to-be-classified data by using the final classification model, to obtain a classification result; and
output the classification result.

15. A non-transitory computer readable storage medium storing instructions, wherein the instructions, when executed by a processor, cause the processor to:
obtain a training sample, the training sample comprising a training parameter and a true classification corresponding to the training parameter, wherein the training parameter comprises the following parameters:
a type of reading;
a type of joined activity; and
a subscribed official account;
perform classification training on an initial classification model by using the training parameter, to obtain a predicted classification;
determine, according to a gradient loss function of the initial classification model, a residual between the true classification and the predicted classification, the gradient loss function being based on a modification prediction function which is modified from a prediction function according to a distance vector, wherein:
the number of elements in the distance vector equals to the number of education level classifications; one of the elements in the distance vector represents a distance factor; the distance factor represents a distance between a first category and a second category; rest of the elements in the distance vector are same constant numbers; and
the first category and the second category each comprises the following categories:
a doctoral degree category;
a master's degree category;
a bachelor degree category;
a college degree category;
a high school degree category;
a junior high school degree category; and
an elementary school degree category;
the doctoral degree category, the master's degree category, the bachelor degree category, the college degree category, the high school degree category, the junior high school degree category, and the elementary school degree category correspond to label values following a sequential order; and
the distance factor is based on a difference between a label value of the first category and a label value of the second category; and
modify, according to the residual, the initial classification model to obtain a final classification model.

16. The non-transitory computer readable storage medium according to claim 15, wherein the instructions, when executed by the processor, further cause the processor to:
receive to-be-classified data;
classify the to-be-classified data by using the final classification model; and
output the classification result.

17. The non-transitory computer readable storage medium according to claim 15, wherein:
when the instructions cause the processor to perform classification training on the initial classification model by using the training parameter obtained by using the sample obtaining unit, to obtain the predicted classification, the instructions cause the processor to:
perform iterative calculation on the initial classification model by using the training parameter, to obtain a predicted classification generated by a classification model used in each iteration;

when the instructions cause the processor to determine, according to the gradient loss function of the initial classification model, the residual between the true classification and the predicted classification, the instructions cause the processor to:
  determine, according to the gradient loss function of the initial classification model, a residual between the true classification and the predicted classification generated in each iteration; and when the instructions cause the processor to modify, according to the residual, the initial classification model to obtain the final classification model, the instructions cause the processor to:
  modify, according to a residual determined in the $M^{th}$ iteration, a classification model used in the $M^{th}$ iteration to obtain a classification model used in the $(M+1)^{th}$ iteration, and
  obtain the final classification model by means of at least one iterative modification, the classification model used in the $M^{th}$ iteration being obtained by modifying a classification model used in the $(M-1)^{th}$ iteration according to a residual determined in the $(M-1)^{th}$ iteration, and M being a positive integer greater than 1.

18. The non-transitory computer readable storage medium according to claim 17, wherein, when the instructions cause the processor to determine, according to the gradient loss function of the initial classification model, the residual between the true classification and the predicted classification generated in each iteration, the instructions cause the processor to:
  determine, according to the training parameter, the true classification, and the distance vector which includes the distance factor representing the difference between the category to which the true classification belongs and a category to which a predicted classification in each iteration belongs, a residual between the true classification and the predicted classification in each iteration.

19. The non-transitory computer readable storage medium according to claim 18, wherein, when the instructions cause the processor to determine, according to the training parameter, the true classification, and the distance vector which includes the distance factor representing the difference between the category to which the true classification belongs and the category to which the predicted classification in each iteration belongs, the residual between the true classification and the predicted classification in each iteration, the instructions cause the processor to:
  determine a residual between a predicted classification generated in the $k^{th}$ iteration and the true classification by using the following formulas:

$$\tilde{y}_{ik} == y_{ik} - p_k(x_i),$$

$$p_k(x_i) = \exp(F'_k(x_i)) \Big/ \sum_{l=1}^{K} \exp(F'_l(x_i)), \text{ and}$$

$$F'_k(x_i) = D_{yk} * F_k(x_i),$$

wherein
  $x_i$ is the training parameter, i is a positive integer greater than 1, $y_{ik}$ is the true classification, $\tilde{y}_{ik}$ is the residual between the predicted classification generated in the $k^{th}$ iteration and the true classification, $p_k(x_i)$ is a prediction probability function of the $k^{th}$ iteration, $F_k(x_i)$ is a prediction function of the $k^{th}$ iteration, $D_{yk}$ is the distance vector which includes the distance factor representing a distance between the category to which the true classification belongs and a category to which the predicted classification of the $k^{th}$ iteration belongs, $F_k'(x_i)$ is a modification prediction function of the $k^{th}$ iteration, $F_l'(x_i)$ is a modification prediction function of the $l^{th}$ iteration, and a value of l ranges from 1 to K, wherein K is a quantity of classes of the true classification.

20. The non-transitory computer readable storage medium according to claim 19, wherein, wherein the instructions, when executed by the processor, further cause the processor to:
  receive to-be-classified data;
  classify the to-be-classified data by using the final classification model, to obtain a classification result; and
  output the classification result.

* * * * *